INVENTOR
Adrian P. Brokaw
BY Robert K. Schumacher
ATTORNEY

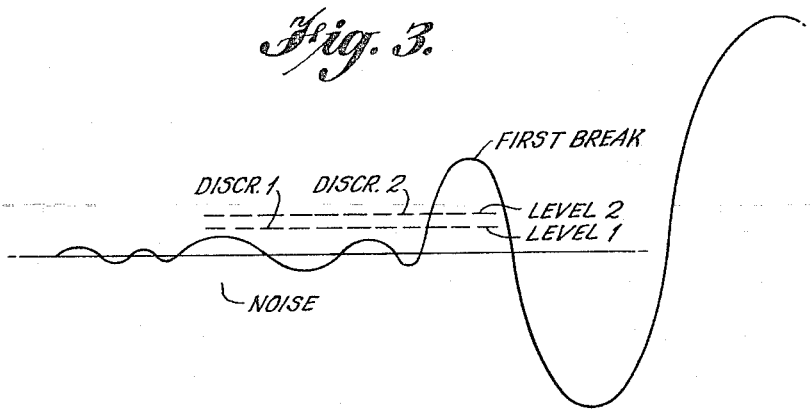
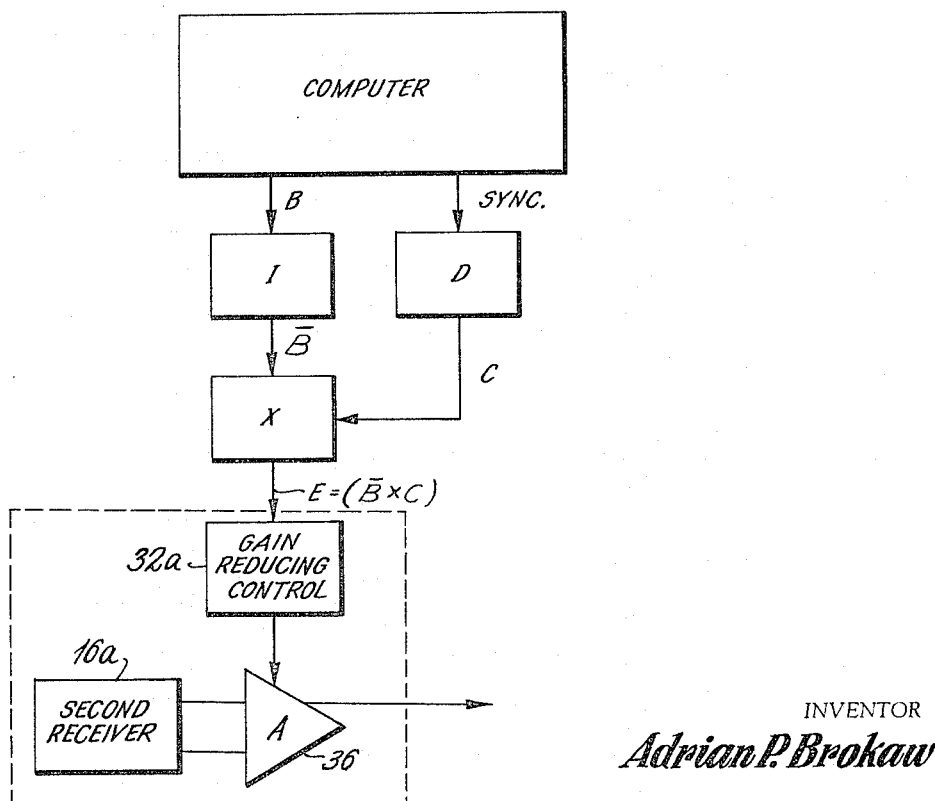

United States Patent Office 3,289,157
Patented Nov. 29, 1966

3,289,157
AUTOMATIC GAIN CONTROL IN ACOUSTIC WELL LOGGING SYSTEMS
Adrian P. Brokaw, Woburn, Mass., assignor to Dresser Industries, Inc., Dallas, Tex., a corporation of Delaware
Filed Dec. 16, 1965, Ser. No. 520,025
7 Claims. (Cl. 340—18)

This is a continuation-in-part of copending application Serial No. 87,854, filed February 8, 1961, by Adrian P. Brokaw, and now abandoned.

The present invention relates to automatic gain control in acoustic well logging systems, and has particular reference to an automatic gain control circuit using logical units in the derivation of a control signal for use in acoustic well logging systems.

A logical unit uses logical relationships among several variables. These relationships may be expressed in terms of "and," "or," and "not," and involves the circuit units of gates, buffers, and inverters to implement the "and," "or" and "not" concepts. The basis for these operations is symbolic logic. These logical operations are performed by determining whether defined logical statements are true or false under a particular set of input conditions. Such true and false alternatives lend themselves to a form of logic known as binary arithmetic, and are easily implemented by a relay being opened or closed, a diode being conducting or non-conducting, and similar on-off equipment conditions.

In logging tools there are amplifiers and other circuit components for processing signals that are to be sent to the earth's surface for recording, comparing, measuring, etc. In order for the tool to send the proper information in the absence of noises and the like, logical operations process the various information available to derive information that defines logical statements or conditions. These logical statements are true or false, and in the form of electrical signals, are used to respectively increase or reduce, for example, the gain of an amplifier.

The invention seeks to provide a novel control in the gain of amplifiers in an acoustic well logging tool in a manner that automatically compensates for changes in the input signals so that the gain of these amplifiers is optimized in order to provide a more accurate representation of the signals indicative of the formations surrounding the well bore.

Therefore, it is the object of this invention to provide a device for automatically deriving suitable control signals for use in acoustic well logging tools.

It is also an object of the invention to use logic or logical circuitry in combination to achieve the result of controlling automatically the gain of an acoustic well logging tool from outputs derived in the tool or from a computer, such as a time interval computer.

It is a further object of the invention to use logical circuitry to obtain automatic gain control in an acoustic well logging tool.

It is another object of the invention to use automatic gain control circuits in acoustic well logging systems.

A complete understanding of my invention together with further advantages which are inherent in the invention, will become apparent from the following description, reference being had to the accompanying drawings wherein:

FIGURE 3 shows a wave form of a noise and signal that may be received by a receiving transducer in acoustic well logging tools;

FIGURE 4 shows a block diagram of logical elements or components forming a circuit for using signals from a computer in accordance with the present invention;

Figure 1:
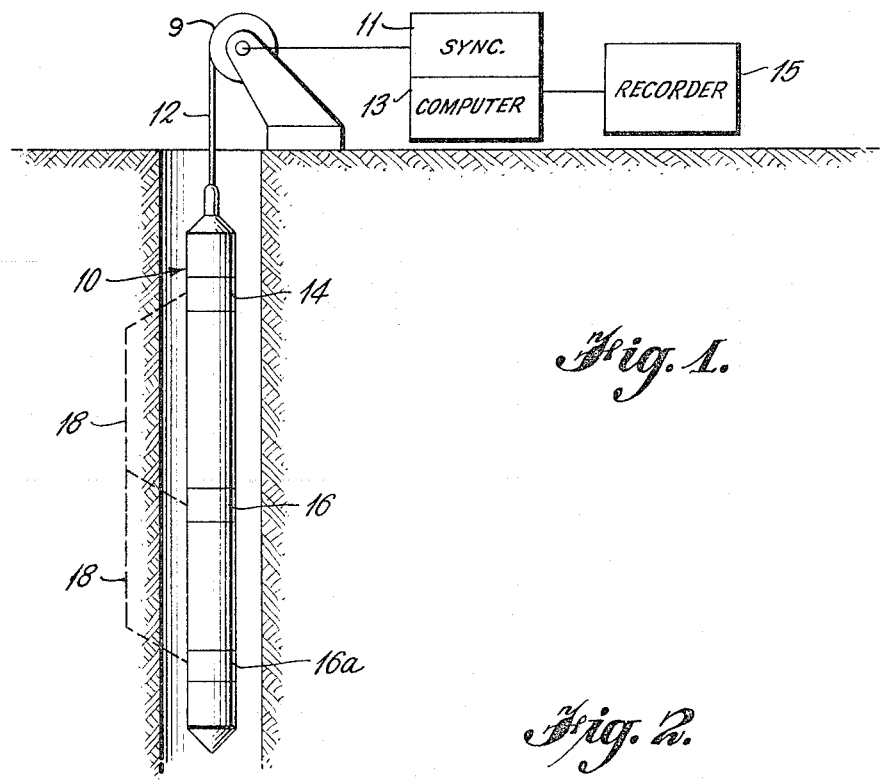
FIGURE 1 is an illustration of an acoustic well logging system which embodies the present invention.

Referring now to the drawings, there is shown in FIGURE 1 an acoustic well logging tool 10 suspended from power winch 9 by a cable 12 from the earth's surface. The well logging tool is lowered into a bore hole by a cable 12 connecting the tool with equipment at the earth's surface, including a synchronizer 11, a computer 13 and a recorder 15. The acoustic well logging tool has a transmitting transducer 14 and two or more receiving transducers 16, 16a. In each cycle of operation the transmitting transducer of the acoustic well logging tool, under the control of the synchronizer 11 at the earth's surface, sends out a burst or surge of acoustic energy, so that a portion of energy received by the receiving transducers passes along paths 18.

More details of such a system for acoustic well logging are shown in the copending application of Engle et al., Serial No. 787,292, filed January 16, 1959, on "Acoustic Well Logging System," now Patent No. 3,112,466, which issued November 26, 1963.

As is well known in the use of acoustic well logging tools, there are random noises caused by the logging tool scraping, impacting or striking against the sides of the well or bore hole. This type of noise is generally called "road noise."

The signals which are received in the acoustic well logging tool therefore come from at least two main sources. The first is the acoustic signal generated by the tool itself. It is received by the receiving transducers 16, 16a of the tool after it passes through the formations or rock surrounding the tool, and the time interval necessary for the energy to pass from the transmitter through the rock or formations to the receiving transducers, respectively, is indicative of the nature of the subsurface formations. It is desirable to detect the first arrival, or what is sometimes called the "first break," of this acoustic signal at each of the receiving transducers 16, 16a. The second main source of signals received in acoustic well logging tools is acoustic noise or road noise described above.

FIGURE 3 shows a diagram of the signals that are received by receiving transducers of a tool. The amplitude of the noise shown is small compared with the amplitude of a first break or half-cycle of the acoustic signal. The characteristics of the wave shape of the first break are useful in setting into operation the receiving amplifiers and other equipment necessary in measuring the received signals. Assuming that the noise characteristic does not exceed a certain level, and that the first break is greater in amplitude than the noise, as is nearly always the case, it is possible to develop information as to character and amplitude of signal and noise and therefrom to control the gain of an amplifier.

It is desirable to use the lowest point possible on a slope of the first break to trigger measuring devices, recording equipment, or receiving amplifiers since the first break has a rather slow rise. It has been found that using a peak point of the first break for triggering the measuring devices and the like produces in some cases an undesirable error, because the first break fluctuates in size and level depending on the amount of attenuation in the formation that is being measured. In order to obtain a high quality in recording the acoustic measurements of the formations, it is essential to provide control of the gain of the amplifiers in the receiver channels, that accomplish the processing of the first break. The gain should be increased as high as possible, but, at the same time, the gain of these amplifiers must not be so high as to cause the measuring circuits to be triggered by ambient noise.

Figure 2:
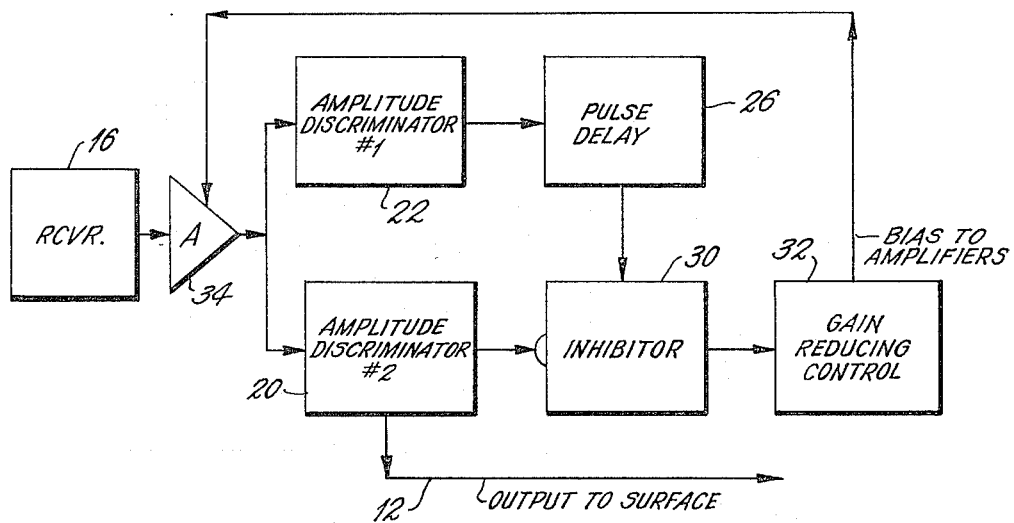
FIGURE 2 shows a block diagram of logical connectives for deriving automatic gain control in acoustic well logging tools.

An amplifying circuit 34 of FIGURE 2 installed in the acoustic well logging tool of FIGURE 1 is used to amplify the received signals from the receiving transducer 16, and a similar amplifying circuit 36 should be used on receiver 16a.

Signals from amplifying circuit 34 are presented to an amplitude discriminator 20 having the function to deliver to the logging cable 12 and thus to the surface computer 13, an electrical pulse indicating only the first arrival of acoustic energy at the receiving transducer. The amplitude discriminator 20 is set to trigger and produce and output pulse upon receipt of input signals whose amplitudes are above a certain specified level. The discriminator may be in the form of a Schmitt discriminator having a dead time long enough to prevent triggering more than once in the same operating cycle. The waveform diagram of FIGURE 3 depicts this as level 2. As is shown in FIGURE 2 the input of discriminator 20 is coupled from the output of amplifier 34. This amplifier has its output coupled also to a similar amplitude discriminator 22 which is set to a level slightly below that of discriminator 20 and shown in FIGURE 3 as level 1. The levels at which each of these discriminators operate are set very close to each other, the setting being substantially on the steep portion of the first break which is also near the zero level thereof, so that the difference in time between the operation of these discriminators, or the time between their respective triggering times, is very small, usually on the order of a microsecond or less.

A pulse triggers the discriminator 22 and it thereupon produces an output pulse that is coupled through a conventional pulse delay device 26 (such as a delay line) in which the pulse is delayed approximately one or two microseconds. The delayed pulse is then coupled to an inhibitor 30 which is a circuit performing the "not-and" function by inhibiting the passage of a pulse when a control pulse is received. Typical inhibitor circuits and their functions are as described in "Pulse and Digital Circuits" by Jacob Millman and Herbert Taub, McGraw-Hill Book Company, Inc., New York, 1956, pages 401–404. It is merely a gate circuit which closes when a control or gate pulse is received. The delay of one or two microseconds of the pulse delay 26 is substantially long enough to permit discriminator 20 to have triggered if both of the discriminators are triggered by a first break. The control pulse from the output of discriminator 20 applied to inhibitor 30 will then inhibit the passage of the delayed pulse from the discriminator 22 and there is no output produced at the inhibitor. The inhibitor is coupled to a gain reducing control 32 to provide a gain reducing bias to the amplifier 34. Thus there is no gain reducing output generated in absence of a signal from the inhibitor.

If the average noise level increases to level 1 of FIGURE 3, the discriminator 22 will trigger on this noise before receiving the first break. Since discriminator 20 is set to a level 2, which is higher than level 1, the discriminator 20 does not trigger, and the inhibitor does not operate. After the pulse from the discriminator 22 passes the pulse delay, the inhibitor passes the pulse to a gain reducing control 32.

The characteristic nature of the gain reducing control is that when it receives an input, it provides a control signal to reduce to a slight degree, the gain of the amplifier 34, supplying signals to the discriminators 20 and 22. Further, in the event that no more inputs are received by the gain reducing control, the gain of the input amplifiers is allowed to increase toward some preset maximum after a few cycles of operation. The gain reducing control may be a conventional ratemeter circuit, such as a simple RC integration network simply integrates all pulses of the output of the inhibitor and uses the resulting voltage to reduce the gain of an amplifier, which may use, for example, a variable mu tube. In absence of applied pulses, the voltage on the condenser of the gain reducing control decays and the amplifier returns toward its full gain. By the operation of this circuit the gain is made to fluctuate under control very slightly about a point at which the noise output is at level 1 of FIGURE 3. This maintains the average noise level, due to scraping or sliding along the bore hole of the acoustic well logging tool just below the level necessary to trigger discriminator 20. This maintains the gain as high as is practical under any set of average noise conditions to provide an improved accuracy of the information derived from the acoustic well logging tool for recording on a recorder.

It will be apparent that occasionally some noise occurs having a level which is considerably above the average noise level due to the tool striking projections on the side of the well bore, or other such similar causes. These noises trigger the two discriminators substantially simultaneously, and therefore because the noises do trigger the discriminators almost simultaneously, there is effected no reduction in the gain. A scheme other than that of FIGURE 2 is necessary to overcome this difficulty.

When there is only an occasional such occurrence of noise, it is not so troublesome, and may be dealt with by other apparatus and means as shown in my copending application for patent entiled Acoustic Velocity Logging System and Computer, filed February 8, 1961, having Serial No. 87,853, now Patent No. 3,177,467. There are, however, certain "bad spots" in some wells which appear to be exceptionally noisy. In these bad spots, when the noises are not greater in amplitude than the first break, a record may be obtained, however, only by considerably reducing the gain. A different situation is present where the noises are greater than the first break, so that it becomes very difficult to measure even by reducing the gain. Under these conditions, reducing the speed of the logging operation, which will reduce the amplitude of these noises, appears to be the most expedient means of obtaining a measurement. It is the situation in which reducing the gain will assist in the obtaining of measurements but in which the apparatus of FIGURE 2 is inadequate that is now to be considered.

Figure 8:
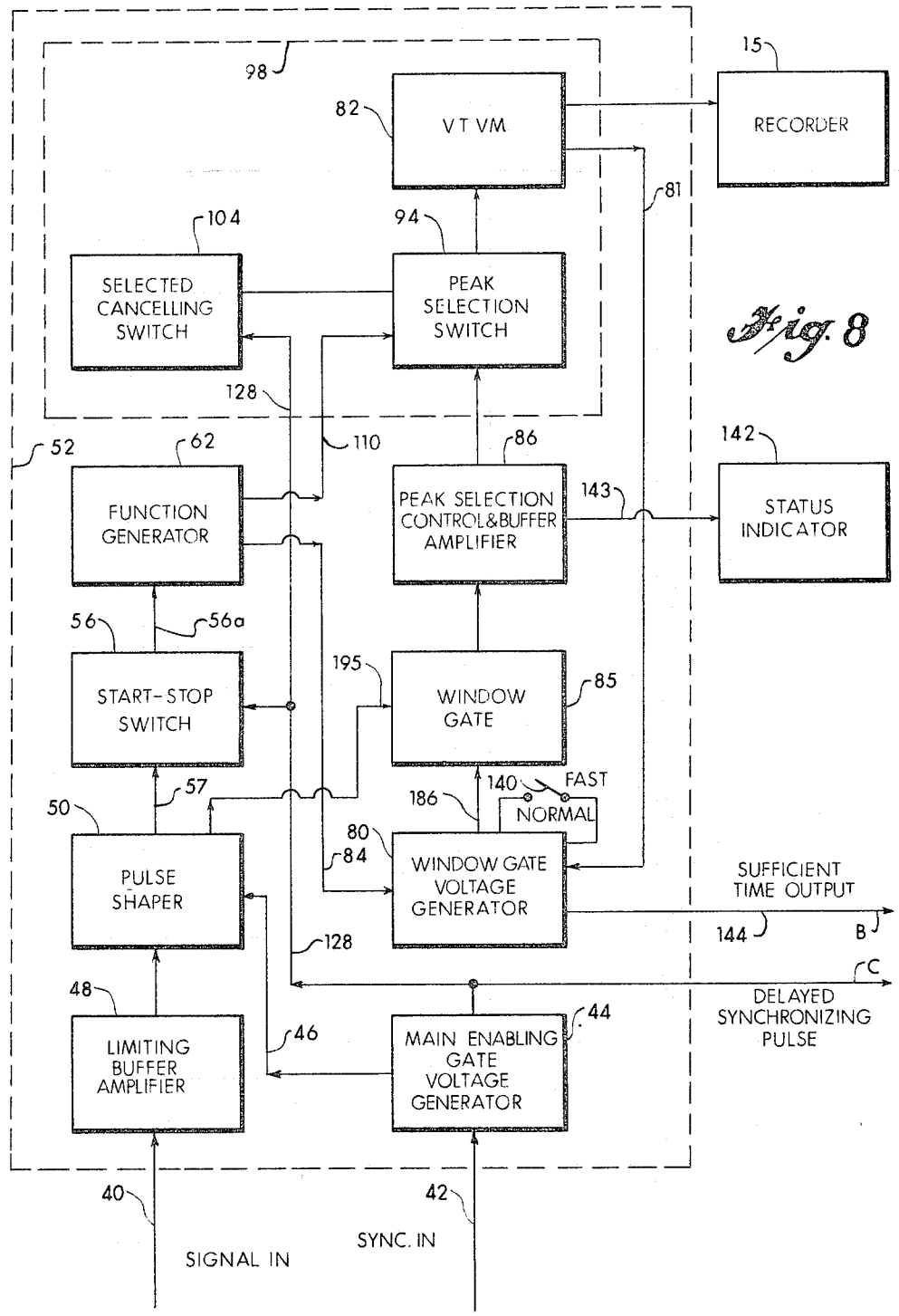
FIGURE 8 shows a functional diagram of the internal details of one form of the computer depicted in FIGURE 6.

Referring now to FIGURE 8, there may be seen a functional representation of the internal circuitry of the computer 13 described in the said Patent No. 3,177,467, wherein the sync pulses from synchronizer 11 through appropriate circuitry periodically excite the acoustic transmitting transducer 14 in the tool. These sync pulses are also coupled by conductor 42 to a main enabling gate voltage generator 44 which may be a monostable multivibrator or "univibrator." The enabling gate generator 44 is arranged to produce an output pulse at the end of a preselected interval after actuation by the pulse from the synchronizer 11. On conductor 46 of said main enabling gate generator appears a pulse which commences with the synchronizing pulse and terminates at the end of the operating cycle of the computer 13. The computer 13 is OFF during the preselected interval. The preselected interval is sufficiently long to allow spurious and extraneous noises generated coincident with the trigger pulse to decay. It does not end until a time when a valid information pulse might be expected. This is the time necessary for an acoustic pulse to travel from the transmitter to the nearest receiver through formations having the greatest rate of travel of acoustic waves. When the enabling gate generator 44 produces its output pulse after the preselected interval, the output pulse produced is sufficiently long to encompass the total interval of the time that pulse information is expected to be received from the tool 10 under ordinary conditions. This is the time necessary for an acoustic pulse to travel from the transmitter to the farthest receiver through formations having the least rate of travel of acoustic waves. The total interval of time is considered reasonable and adequate to receive pulses corresponding to the wide range of acoustic velocities of sound in the bore hole formations normally encountered. Conductor 46 connects the output of the enabling gate generator 14 to a pulse shaper 50 to enable it, or actuate it into operating condition, for the duration of the output pulse. The limiting buffer amplifier 48 responds to signal information or pulses having the intervals therebetween related to information as well as extraneous noises, which is received from the tool 10 over cable 12.

The output of the limiting buffer amplifier 48 is coupled to a pulse shaper 50, which in the preferred embodiment shown, is a triggered blocking oscillator. The effect of the pulse shaper 50 is to reduce the rise-time and width of the input pulse thereto, from say about 20 microseconds to 1 microsecond.

The first received pulse passing through the pulse shaper 50 is coupled to a start-stop switch 56 to turn it ON. The second received pulse from the pulse shaper 50 turns it OFF. The start-stop switch 56 may be of any type of bistable circuit, such as a multivibrator, flip-flop or Eccles-Jordan configuration, so that each successive pulse on the signal input lead 57 will reverse the operating state of the circuit. As the first received pulse appears at the start-stop switch 56, there is a change in voltage at an output 56a of the switch. The second received pulse appearing at the start-stop switch 56 resets the switch to its original or first state. This action is well known in bistable devices.

The output 56a of the start-stop switch 56 is coupled to a function generator 62. The function generated by the generator 62 is one having single values along the X and Y coordinates of the function, generally known as a monotonic function. The monotonic function is usually a linear function and an example of a generator for the function is a bootstrap circuit. The ON condition of the switch 56 initiates a charging operation of a condenser in a conventional R-C circuit (not shown). The OFF condition of the switch 56 stops altogether the charging operation of the condenser. The second received pulse, as mentioned above, places the switch 56 in the OFF condition, and therefore, stops the charging of the condenser.

The peak output voltage of the function generator 62 is a precise function of the time the bootstrap circuit was charging the condenser, or the time that the function generator 62 was ON. When the switch 56 is turned OFF, a clamp tube (not shown) discharges the condenser to drive the pen on the recorder 15 in a conventional manner.

A window gate voltage generator 80 is used to generate a gate voltage from a connection or conductor 81 from the vacuum tube voltmeter 82 at a point which has a voltage more positive than ground voltage. This positive voltage is proportional to the input of the vacuum tube voltmeter 82 and is indicative of the last valid measurement of the peak selection switch 94. Another conductor 84, connected from the function generator 62, is also connected to the window gate voltage generator 80. A voltage is added to the original voltage connected from the function generator 62, and this sum is compared with the voltage from the vacuum tube voltmeter 82. When these two voltages are equal, a pulse of preselected amplitude is generated by a univibrator circuit in the window gate voltage generator 80, when triggered by the output of the univibrator circuit in window gate voltage generator 80. This produces a pulse called the window gate pulse over lead 186, and is applied to the window gate 85 which "opens" to pass signals for the duration of the pulse.

Thus, when this window gate pulse is present, all outputs from the pulse shaper 42 are passed and coupled to the peak selection control and buffer amplifier 86. That is, the window gate pulse and the pulse from the pulse shaper 50 must be coincident in order to trigger the peak selection control and buffer amplifier 86.

The window gate 85 passes a small signal even when closed. In normal operation the pulses pass through the open window gate 85 and a multivibrator circuit in the peak selection control 86 is triggered on each sample. When the pulse (of the pair to be measured) occurs when the window gate 85 is closed, the multivibrator does not trigger on the reduced input. If successive reduced inputs are applied, however, trigger sensitivity will be thereby increased and by selection of components, the sixth reduced input pulse is made sufficient to trigger the multivibrator.

When the multivibrator circuit in the peak selection control 86 changes its condition of stability in response to having received a pulse through the window gate 85, the peak value of the stored information, in the condenser in the peak selection switch 94, is presented to the vacuum tube voltmeter 82.

The peak value presented to the voltmeter 82 is then coupled to a utilization device or a recorder 15 of any conventional construction. The recorder 15 provides a graphic presentation of the information relative to the time interval between acceptable pulses, when all the conditions imposed by the computer have been satisfied.

The signal on lead 143 may be used in conjunction with another signal present on conductor 144 to correct control variables in the subsurface tool 10. The pulse on conductor 144 indicates that the new sample was nearly as long, or was longer, than the last valid information sample. Furthermore, by its absence it indicates that a substantially shorter interval may be required.

In a system using an improved interval time computer, such as my Patent No. 3,177,467 referred to above, there are within this computer certain available outputs which indicate that the signals being received are in error. Such a computer is a device which can accept and process input information and supply useful output information derived from the input information. The interval time computer described in said Patent No. 3,177,467 for "Acoustic Velocity Logging System and Computer" uses pulses received from receiving transducers of the well logging tool 10 and from the synchronizer 11 to produce: (1) a status output signal to indicate that valid signals are being measured (signalled by status indicator 142 of said Patent No. 3,177,467); (2) a sufficient time output signal from a gate voltage generator circuit of the computer to indicate that, after a valid measurement is made, succeeding information constituting a pulse pair with a time interval therebetween has been processed and the time interval therebetween has been found to be more than a predetermined time less than the said valid measurement (this output appearing at conductor 144 of said Patent No. 3,177,467); (3) and a command pulse to indicate that the measurement cycle has commenced (this pulse appearing on conductor 34a of said Patent 3,177,467). It is possible to use these outputs for automatically deriving suitable signals for adjusting the gain of a subsurface tool. These signals may be then transmitted to the tool to aid in correcting the erroneous signals which it is producing due to noise. From the interval time computer described in said Patent No. 3,177,467 there are two outputs, both of which will be present if the signals are not in error. If the interval between pulses becomes too short, neither of these outputs appears. For simplicity, the status output signal of the improved interval time computer is a signal indicating the receipt of a valid measurement by the computer, and may be called a Status Output Signal A, and the lack or absence of the Status Output is called $\overline{A}$ or "not A."

The sufficient time output signal indicates that the time interval being measured has a value greater than a minimum which is slightly less than the last accepted time interval, and is called a Sufficient Time Output B, and the absence or lack thereof may be called $\overline{B}$ or "not B."

Let the arithmetic multiplication symbol × indicate the logical "AND," and the plus symbol (+) indicate the logical "OR"; let the symbol I indicate an inverter or "not" circuit which changes, for example, A to $\overline{A}$, or vice versa. Symbol C is a command signal which may be generated from a delayed synchronizing pulse, at a time such that A and B will have appeared, if they appear at all, and have not yet disappeared. This delayed signal may be conveniently derived from the main enabling gate voltage generator 34 of the computer of said Patent No. 3,177,467 and may be the negative wave front appearing on conductor 34a thereof. Let the symbol D indicate a signal delay means, which may be conventional.

By the use of these above conventions with a 2-valued logic system, certain devices are described which may be constructed using "these logical building blocks." These so-called blocks are well-known circuits designed to perform one or more of these logical functions electronically. Such circuits may be found in the above noted reference by Millman and Taub, chapter 13.

In the simplest case let us first assume that spurious noise pulses will have more apparent effect on an acoustic receiving transducer which is spaced relatively far from the transmitting transducer in a system such as is described and claimed in the copending application, Engle et al., for an Acoustic Well Logging System, filed January 16, 1959, having Serial No. 787,292, now Patent No. 3,112,466, which issued November 26, 1963. The effect is less where the receiving transducer is relatively close to the transmitting transducer, since the signal-to-noise ratio becomes progressively poorer as the distance from the transmitting transducer increases. From this it is expected that, if the acoustic interval from one receiving transducer to the next in a multiple receiving transducer system decreases faster than valid signals may be presumed to do, in all likelihood the second or more distant receiving transducer has triggered on noise. If this happens repetitively, it is desired to reduce the gain of an amplifier 36 of FIGURE 4 of this second receiving transducer in the expectation that it is possible to detect the first break above the level of the noise. The amplifier may constitute an amplifier channel. This may be done in the following manner. If the interval as measured by the computer is in error there will be no output A. If the interval is in error by being too long the computer will provide an output B. If the interval is in error by being too short there will be no output B. C may be generated by delaying the synchronizing pulse long enough so that all other computer outputs will be present. The computer outputs must be stretched in a conventional manner so that they all overlap at some time between samples or sampling.

FIGURE 4 shows in block diagram the configuration of a logic circuit expressed by $E=\overline{B}\times C$. The signal E is a pulse signal coupled to a gain reducing control 32a for the second receiving amplifier 36 in the same manner that was described for the gain reducing control above when the signal E is sent to the subsurface tool. Thus, whenever the computer determines that the second received pulse was too early, the gain of the amplifier 36 is reduced. When this condition does not obtain, the gain of the amplifier 36 increases gradually toward full gain as the charge leaks off the condenser means of the gain control circuit.

In an interval time computer producing a first window gate voltage indicating that there is sufficient time between the synchronizing pulse and a first received signal pulse, as described in FIGURE 3 of my Patent No. 3,177,467 for Acoustic Velocity Logging System and Computer, this indicating voltage may be used to obtain more accurate control of the gain of amplifiers 34, 36 coupled to the first and second receiving transducers, respectively. Let this window gate voltage which is defined as the first receiver sufficient time output, be called F, and the signal to reduce the gain of the amplifier 34 be called G, $\overline{F}\times C=G$. This follows the same logic as $E=\overline{B}\times C$. It is shown in block diagram form in FIGURE 5. If H represents the status signal from the first interval, then the term $F\times \overline{H}$ indicates that the signal from the first receiver was late, due perhaps to attenuation. This will make the second interval too short. The circuit of FIGURE 4 would indicate the need to reduce the gain of the second amplifier 36 when, in fact, it was the first pulse and not the second that was in error. Therefore, in FIGURE 5, the signal E is passed through an inhibitor N, and hence E is inhibited in the presence of $(F\times \overline{H})$ so that $\overline{(F\times \overline{H})}\times \overline{B}\times C=E'$, where E' is the signal pulse applied under the desired conditions to reduce the gain of amplifier 36.

Figure 5:
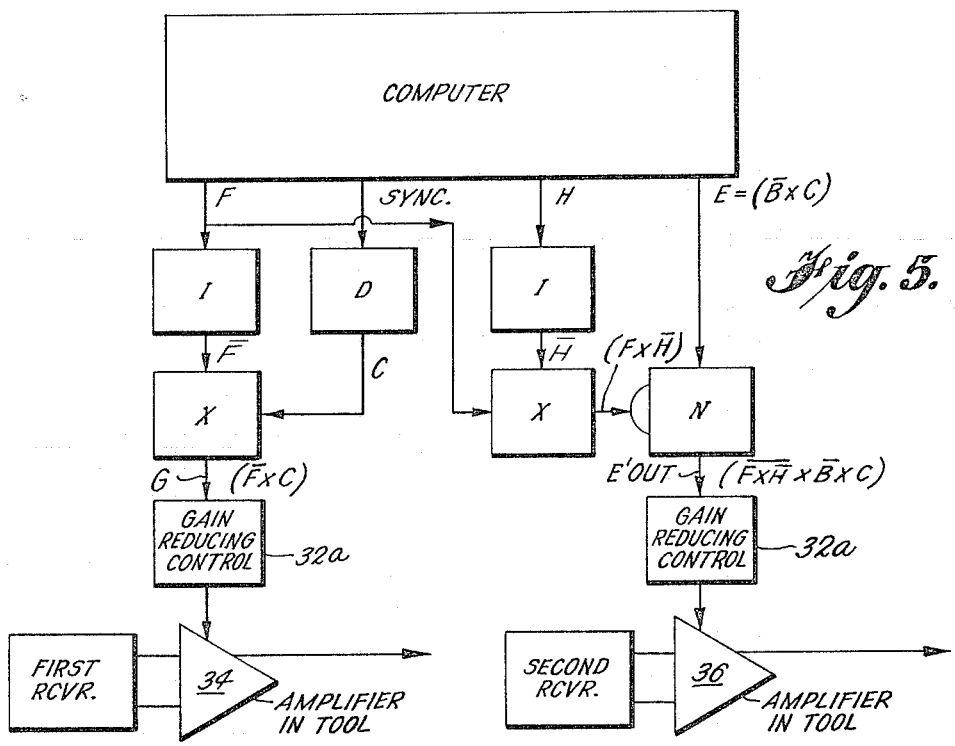
FIGURE 5 shows other logical elements in circuit arrangement for deriving automatic gain control in accordance with the present invention.
Figure 6:
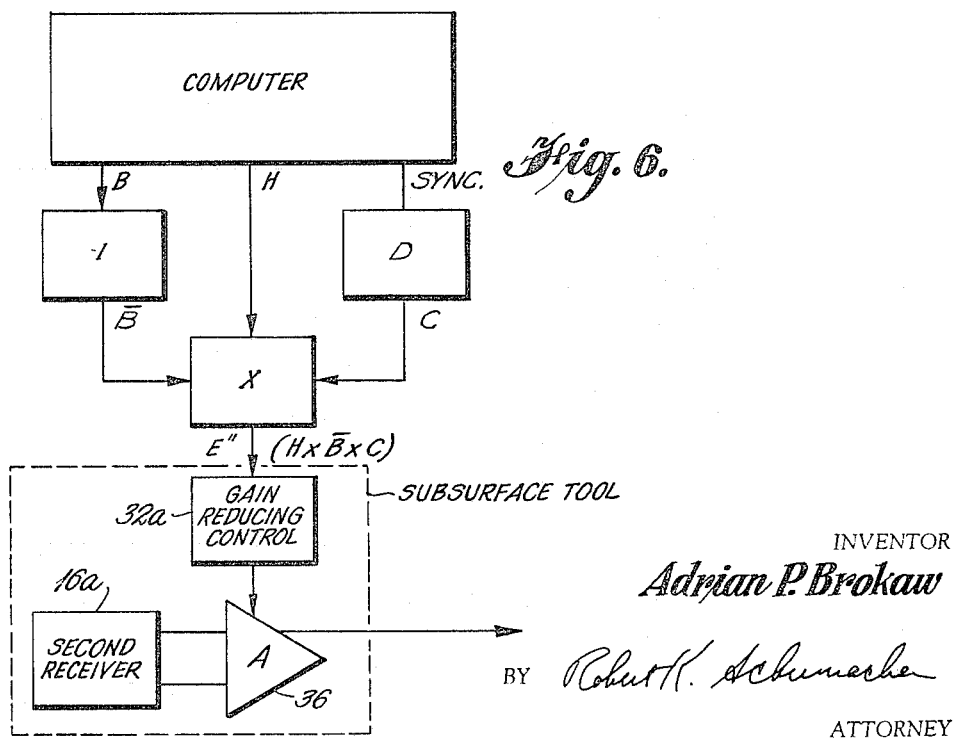
FIGURE 6 shows a circuit arrangement of logical elements for automatic gain control in accordance with the present invention.

FIGURE 6 shows an alternative arrangement for controlling the gain of amplifier 36 and produces the same control of this amplifier as was achieved by the arrangement of FIGURE 5. The operation of the arrangement of FIGURE 6 is $H\times \overline{B}\times C=E''$, where E'' is the signal pulse applied under the desired conditions to reduce the gain of amplifier 36.

It can readily be seen to anyone skilled in the art that further combinations would be possible; for example, the term $(\overline{H}\times F)$ would be a signal indicating that the gain amplifier 34 should be increased.

$$(\overline{F}\times \overline{B}\times C)+(H\times B\times \overline{A}\times C)$$

would indicate that the gain for amplifier 36 should be increased. These are representative samples only of logical circuitry in controlling the automatic gain of amplifiers in an acoustic well logging tool, and it should be realized that by the operation of factoring and other recombination schemes, other and perhaps simpler circuits may well be derived.

The invention in this case lies in the logical combining of outputs from the computer or computers in such a way as to produce gain controlling signals for a subsurface tool for well logging operations.

There have been these two methods described separately for forming integrated gain control systems. As is apparent the first system controls the relative gain according to the average noise level, while the second system controls the gain according to the peak noises.

Figure 7:
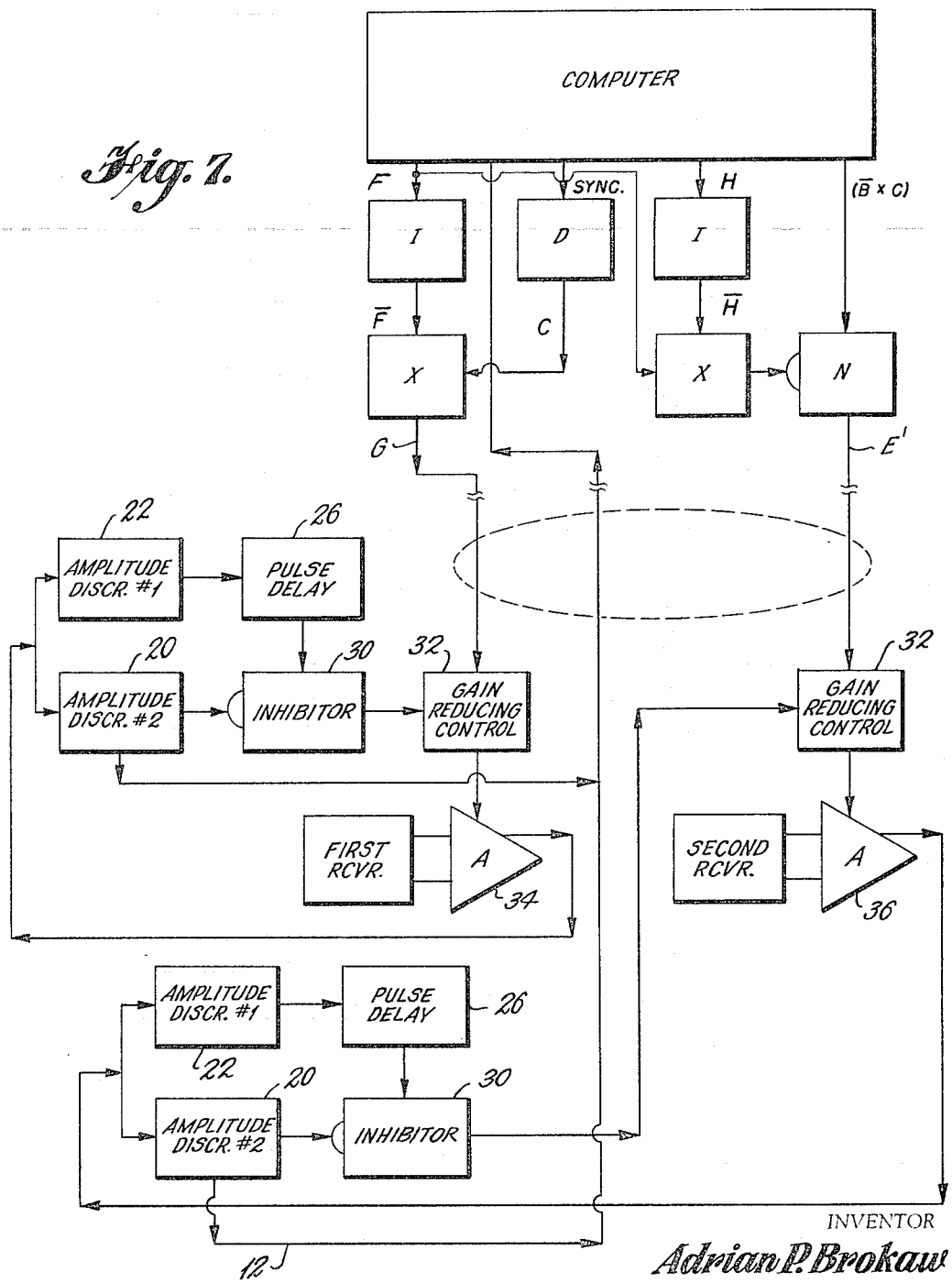
FIGURE 7 shows a circuit arrangement forming a system using logical circuit elements for automatic gain control in accordance with the present invention.

A combined system of these gain control devices as shown in FIGURE 7 allows an acoustic well logging system to be operated by somewhat less highly experienced operators, and the system reacts much more quickly than even the best trained operator by using indications derived by the computer from the signal information. Such swift reaction in using these automatic gain control devices is valuable when logging strata composed of many thin beds and where the gain requirements are found to change abruptly.

There are two methods described herein affording an automatic gain control system for acoustic well logging systems. They may be used independently or may be combined into the same system to provide a more sophisticated control than that afforded by either one separately.

It should be understood, however, that the specific apparatus herein illustrated and described are intended to be representative only, as many changes may be made therein without departing from the clear teachings of the invention. Accordingly, reference should be made to the following claims in determining the full scope of the invention.

What is claimed is:
1. An acoustic well logging system comprising
   a first acoustic energy receiver arranged and adapted to develop a first electrical signal functionally related to a received acoustic energy signal;

a first amplifier means for receiving and amplifying said first electrical signal and having a preselected discrimination level;

a second acoustic energy receiver spaced from said first receiver and arranged and adapted to develop a second electrical signal functionally related to a received acoustic energy signal;

a second amplifier means for receiving and amplifying said second electrical signals; and logical circuit means interconnected with said first and second amplifier means for developing information relative to the occurrence of said received acoustic energy signals; said logical circuit means including means for developing a status output signal indicating that said acoustic signal was received by said first receiver in a sufficient period of time when an acoustic signal should have been received;

means for developing a sufficient time output signal functionally related to the receipt of said acoustic signal by said second receiver with respect to the period time when an acoustic signal should have been received, means for developing a synchronizing pulse for initiating a cycle of operation of said system, a first NOT circuit coupled to receive said third signal indicating that said acoustic signal was received by said first receiver in a sufficient period of time, a first delay means coupled to receive and to delay said synchronizing pulse, a first AND circuit producing an output in response to the coincidence of the outputs of said first NOT circuit and said first delay means, a second NOT circuit coupled to receive said fourth signal indicating that said acoustic signal was received by said second receiver in a sufficient period of time, a second AND circuit producing an output in response to the coincidence of the output of said second NOT circuit and said third signal, and a first inhibitor circuit producing an output in response to the anti-coincidence of the outputs of said second AND circuit and said fourth signal;

said acoustic well logging system further comprising first gain control means connecting said output from said first AND circuit to adjust the gain of said first amplifier means and second gain control means connecting the output from said first inhibitor circuit to adjust the gain of said second amplifier means, said first gain control means including first and second amplitude discriminators each coupled to the output of said first amplifier means and each producing output signals upon receipt of signals greater than said preselected discrimination level of said first amplifier means, said first discriminator having a discrimination level lower than that of said second discriminator, a second delay means coupled to delay the output signals from said first discriminator, a second inhibitor circuit producing an output in response to the anti-coincidence of the outputs of said second delay means and said second discriminator, and gain reducing means responsive to said output of said second inhibitor circuit for reducing the gain of said first amplifier means.

2. An acoustic well logging system comprising a first acoustic energy receiver arranged and adapted to develop a first electrical signal functionally related to a receiver acoustic energy signal;

a first amplifier means for receiving and amplifying said first electrical signal;

a second acoustic energy receiver spaced from said first receiver and arranged and adapted to develop a second electrical signal functionally related to a received acoustic energy signal;

a second amplifier means for receiving and amplifying said second electrical signal; and logical circuit means interconnected with said first and second amplifier means for developing information relative to the occurrence of said received acoustic energy signals; said logical circuit means including means for developing a third signal indicating that said acoustic signal was received by said first receiver in a sufficient period of time when an acoustic signal should have been received, means for developing a fourth signal functionally related to the receipt of said acoustic signal by said second receiver with respect to the period time when an acoustic signal should have been received, means for developing a synchronizing pulse for initiating a cycle of operation of said system, a first NOT circuit coupled to receive said third signal indicating that said acoustic signal was received by said first receiver in a sufficient period of time, a delay means coupled to receive and to delay said synchronizing pulse, a first AND circuit producing an output in response to the coincidence of the outputs of said first NOT circuit and said delay means, a second NOT circuit coupled to receive said fourth signal indicating that said acoustic signal was received by said second receiver in a sufficient period of time, a second AND circuit producing an output in response to the coincidence of the output of said second NOT circuit and said third signal, and an inhibitor circuit producing an output in response to the anti-coincidence of the output of said second AND circuit and said fourth signal;

said acoustic well logging system further comprising means connecting said output from said first AND circuit to adjust the gain of said first amplifier means and means connecting the output from said inhibitor circuit to adjust the gain of said second amplifier means.

3. An acoustic well logging system comprising at least one acoustic energy receiver arranged and adapted to develop an electrical signal functionally related to a received acoustic energy signal;

amplifier means for receiving and amplifying said electrical signal; and logical circuit means interconnected with said amplifier means for developing information relative to the occurrence of said received acoustic energy signals; said logical circuit means including means for developing a status output signal indicating that said acoustic signal was received by said receiver in a sufficient period of time when an acoustic signal should have been received, means for developing a synchronizing pulse for initiating a cycle of operation of said system, means for developing a sufficient time output signal indicating that a time interval being measured by said logical circuit means and related to said occurrence of said acoustic signal has a value greater than a minimum which is less than the last corresponding measured time interval, a NOT circuit coupled to receive said signal indicating that said acoustic pulse was received in a sufficient period of time, a delay means coupled to receive and to delay said synchonizing pulse, and an AND circuit producing an output in response to the coincidence of said sufficient time output signal and the outputs of said NOT circuit and said delay means;

said acoustic well logging system further comprising means connecting said output from said AND circuit to adjust the gain of said amplifier means.

4. An acoustic well logging system comprising
at least one acoustic energy receiver arranged and adapted to develop an electrical pulse functionally related to a received acoustic energy pulse;
amplifier means for receiving and amplifying said electrical pulse; and
logical circuit means interconnected with said amplifier means for developing information relative to the occurrence of said received acoustic energy pulses; said logical circuit means including
means for developing a signal indicating that said acoustic pulse was received by said receiver in a sufficient period of time when an acoustic pulse should have been received,
means for developing a synchronizing pulse for initiating a cycle of operation of said system,
a NOT circuit coupled to receive said signal indicating that said acoustic pulse was received in a sufficient period of time,
a delay means coupled to receive and to delay said synchronizing pulse, and
an AND circuit producing an output in response to the coincidence of the outputs of said NOT circuit and said delay means;
said acoustic well logging system further comprising means connecting said output from said AND circuit to adjust the gain of said amplifier means.

5. An acoustic well logging system comprising
at least one acoustic energy receiver arranged and adapted to develop an electrical signal functionally related to a received acoustic energy signal;
amplifier means for receiving and amplifying said electrical signal; and
logical circuit means interconnected with said amplifier means for developing information relative to the occurrence of said received acoustic energy signals; said logical circuit means including
means for developing an indicating signal indicating that said acoustic signal was received by said receiver during a period other than the period within which an acoustic signal should have been received,
means for developing a sufficient time output signal indicating that a time interval being measured by said logical circuit means and related to said occurrence of said acoustic signal has a value greater than a minimum which is less than the last corresponding measured time interval,
means for developing a synchronizing pulse for initiating said cycle of operation of said system,
a delay means coupled to receive and to delay said synchronizing pulse,
an AND circuit producing an output in response to the coincidence of said indicating signal and the output of said delay means;
said acoustic well logging system further comprising means connecting said output from said AND circuit to adjust the gain of said amplifier means.

6. An acoustic well logging system comprising
at least one acoustic energy receiver arranged and adapted to develop an electrical signal functionally related to a received acoustic energy signal;
amplifier means for receiving and amplifying said electrical signal; and
logical circuit means interconnected with said amplifier means for developing information relative to the occurrence of said received acoustic energy signals; said logical circuit means including
means for developing a status output signal indicating that said acoustic signal was received by said receiver in a sufficient period of time when an acoustic signal should have been received,
means for developing a synchronizing pulse for initiating a cycle of operation of said system,
a NOT circuit coupled to receive said status output signal indicating that said acoustic signal was received in a sufficient period of time,
a delay means coupled to receive and to delay said synchronizing pulse, and
an AND circuit producing an output in response to the coincidence of the outputs of said NOT circuit and said delay means;
said acoustic well logging system further comprising means connecting said output from said AND circuit to adjust the gain of said amplifier means.

7. An acoustic well logging system comprising
at least one acoustic energy receiver arranged and adapted to develop an electrical signal functionally related to a received acoustic energy signal;
amplifier means for receiving and amplifying said electrical signal; and
logical circuit means interconnected with said amplifier means for developing information relative to the occurrence of said received acoustic energy signals; said logical circuit means including
means for developing an indicating signal indicating that said acoustic signal was received by said receiver during a period other than the period within which an acoustic signal should have been received,
means for developing a synchronizing pulse for initiating a cycle of operation of said system,
a delay means coupled to receive and to delay said synchronizing pulse, and
an AND circuit producing an output in response to the coincidence of said indicating signal and the output of said delay means;
said acoustic well logging system further comprising means connecting said output from said AND circuit to adjust the gain of said amplifier means.

References Cited by the Examiner

UNITED STATES PATENTS

| | | | |
|---|---|---|---|
| 2,760,064 | 8/1956 | Bell | 328—117 |
| 3,019,413 | 1/1962 | Brokaw | 181—.5 |
| 3,187,301 | 6/1965 | Summers | 181—.5 X |

BENJAMIN A. BORCHELT, *Primary Examiner.*

R. M. SKOLNIK, *Assistant Examiner.*